United States Patent [19]

Eisenstadt

[11] 4,085,232
[45] Apr. 18, 1978

[54] NEOHESPERIDINE DIHYDROCHALCONE SWEETENING COMPOSITIONS

[75] Inventor: Marvin E. Eisenstadt, Neponsit, N.Y.

[73] Assignee: Cumberland Packing Corporation, Brooklyn, N.Y.

[21] Appl. No.: 751,269

[22] Filed: Dec. 17, 1976

[51] Int. Cl.² ............................................. A23L 1/236
[52] U.S. Cl. ................................... 426/548; 426/658; 426/804
[58] Field of Search ................ 426/548, 658, 650, 804

[56] References Cited

U.S. PATENT DOCUMENTS

| | | | |
|---|---|---|---|
| 3,087,821 | 4/1963 | Horowitz et al. | 426/548 |
| 3,625,711 | 12/1971 | Eisenstadt | 426/548 |
| 3,875,312 | 4/1975 | Eisenstadt | 426/804 X |
| 4,001,453 | 1/1977 | Huber et al. | 426/548 X |

FOREIGN PATENT DOCUMENTS 1,963,736   6/1971   Germany ............................ 426/548

OTHER PUBLICATIONS

Seltzer, C & En, Aug. 25, 1975, pp. 27-28.

Primary Examiner—Raymond N. Jones
Assistant Examiner—Esther M. Kepplinger
Attorney, Agent, or Firm—Steinberg & Blake

[57] ABSTRACT

Neohesperidine dihydrochalcone and other dihydrochalcone derivatives which are obtained, for example, from grapefruit rind and which are many times sweeter than saccharine are utilized in combination in specific proportions with a sugar, with cream of tartar and with vanilla flavor to provide a sweetening composition with a flavor which is very closely akin to that of natural sucrose. The compositions are, however, many times sweeter (weight for weight) than ordinary sugar and therefore are very low in calories.

5 Claims, No Drawings

NEOHESPERIDINE DIHYDROCHALCONE SWEETENING COMPOSITIONS

BACKGROUND OF THE INVENTION

The use of artificial sweeteners in place of sugar for reduction of caloric intake as well as for medical reasons is well known. The artificial sweeteners are used for diabetes and for the treatment of obesity.

Until relatively recently the artificial sweeteners which we used for this purpose were the saccharine and cyclamates. However, the cyclamates have been banned by the Food and Drug Administration and the use of saccharines has also become questionable in recent times.

Attempts have been made to provide natural sweetening agents which are many times sweeter than ordinary sugar, namely sucrose.

Among the natural sweetening agents are neohesperidine dihydrochalcone and naringin dihydrochalcone, as well as salts thereof such as sodium salt and calcium salt, which are obtained from grapefruit rind. These substances are from about 3 to 10 times as sweet as saccharine, e.g. as much as 2,000 times as sweet as sugar. However, despite this tremendously high degree of sweetness, the substances, including their salts, have until now only been usable as flavor enhancers because the sweetening effect thereof is not the same as natural sugar.

Among the disadvantages of the sweetening taste of these substances is that the same have an aftertaste which is somewhat mentholated in taste, for example, something like a mouthwash. Furthermore, the sweetness characteristic when the substance is used is somewhat delayed so that the person using the substance does not have the feeling of natural sweetness. Still further, because of the extreme sweetness thereof it is practically impossible to use these substances in the sufficiently small quantity necessary to achieve sweetness without oversweetening.

SUMMARY OF THE INVENTION

Generally speaking, in accordance with the present invention, a composition is provided of a dihydrochalcone, (either neohesperidine dihydrochalcone or naringin dihydrochalcone, or a salt thereof) or mixtures of dihydrochalcones with a sugar (the term sugar being used in the broad sense to include the hexoses such as glucose and fructose, as well as the disaccharides such as sucrose and lactose) plus cream of tartar and vanilla flavor. The vanilla flavor can be in the form of artificial vanilla flavor, natural vanilla extract, or the like. The composition of the present invention must consist of at least the four components indicated above, namely the dihydrochalcone, the sugar, the cream of tartar and the vanilla flavor and the proportions thereof must be adjusted within limits which will hereinafter be set forth in order to provide compositions which although being many times as sweet as sugar have a natural sweetness which is extremely close to natural sugar and which does not have any menthol-like aftertaste or any delayed sweetness effect.

It is accordingly a primary object of the present invention to provide a sweetening composition utilizing neohesperidine dihydrochalcone or naringin dihydrochalcone, or a salt thereof, which compositions do not have any of the undesired aftertaste or delayed sweetness characteristics of the dihydrochalcone alone.

It is yet a further object of the present invention to provide compositions of the above type which can be used for the sweetening of all types of foods and beverages to provide a sweetening effect like that of natural sugar, but which compositions can be used in low calorie diets.

Other objects and advantages of the present invention will be apparent from a further reading of the specification and of the appended claims.

Neohesperidine dihydrochalcone is a very sweet white crystalline powder which has until now been used only as a flavor enhancer. This compound and the salts thereof are about 7-10 times as sweet as saccharine.

Narginin dihydrochalcone is also a white crystalline powder having a very sweet taste. This compound and its salt are about 3-5 times as sweet as saccharine and these compounds also have only been used until now as flavor enhancers.

I have found that a major reason for the unnaturalness of the sweet taste of the dihydrochalcones, that is the menthol-like aftertaste and the delayed sweetness, is that these compounds affect the back of the tonque whereas sucrose, natural sugar, affects the front of the tongue. I have further found that by combining these compounds with the proper proportions of a sugar, cream of tartar and vanilla flavor, the sweetening effect takes place on the front of the tongue just as in the case of sucrose, so that the sweetness is a very natural sweetness without any delay in sweetness occurring or any menthol-like aftertaste.

As indicated above, in addition to the use of neohesperidine dihydrochalcone or naringin dihydrochalcone, it is possible to use salts thereof such as the sodium salt, potassium salt or calcium salt. Thus, for example, it is possible to use the calcium salt of neohesperidine dihydrochalcone or the sodium salt of naringin dihydrochalcone, or the like. For the purposes of further discussion herein, reference will generally be made to the use of a dihydrochalcone derivative. It is to be understood that this refers to the use of neohesperidine dihydrochalcone or naringin dihydrochalcone or one of the salts thereof.

It should further be noted that reference is made in the compositions of the present invention to the use of a sugar. By this term it is meant to include the sugars which are generally consumed by humans, namely the hexoses and disaccharides, such as sucrose, dextrose, lactose and fructose. It is also possible to use mixtures of sugars.

Reference was further made to the use of vanilla flavor and as indicated above this term is meant to include natural vanilla flavor, artificial vanillin, or the like.

Cream of tartar is, of course, become a name for potassium bitartrate.

In accordance with the present invention a composition is formed, in parts by weight of (a) a dihydrochalcone derivative in an amount of about 0.25–4%, (b) vanilla flavor in an amount of about 0.25–3% (c) cream of tartar in an amount of about 0.5–4% and (d) a sugar in an amount of about 89–99%. As indicated above, these proportions are by weight.

When the above proportions are used in the proportions indicated, the most desired effect of sweetness approaching that of natural sugar is obtained without any undesired aftertaste or unnaturalness sweetness and without any delay in sweetness being achieved.

The reasons why the dihydrochalcone derivatives cannot be used alone for natural sweetness effect have already been discussed.

It is also interesting to note that the dihydrochalcone deriviate cannot be used only with the sugar such as sucrose or the like to obtain the desired natural sweetness because the resulting composition still has a menthol-like aftertaste and the sweetness is still retarded. This is quite interesting since it would be expected that sucrose, which is natural sugar would provide the immediate sweetness without any delay in total sweetness thus being obtained. However, this is not the case and this is probably due to the fact that the amount of sucrose is very small, even though the percentage in the composition is very high, because the total amount of dihydrochalcone must be very low due to the extraordinarily high degree of sweetness of the dihydrochalcone.

If the dihydrochalcone is used with either cream of tartar or alone or with vanilla flavor alone there is practically no reduction in the menthol-like aftertaste or delay in sweetness. Furthermore, if the dihydrochalcone is used with both cream of tartar and vanilla flavor the resulting composition still lacks a spontaneity of flavor and still provides an undesirable menthol-like aftertaste.

The menthol-like aftertaste and delayed sweetness which are present in a composition of the dihydrochalcone plus the sugar is not avoided by the addition of either cream of tartar or vanilla flavor to the composition. However, and much surprisingly, when both cream of tartar and vanilla flavor are added so that the overall composition comprises the four components, namely the dihydrochalcone, the sugar, the cream of tartar and the vanilla flavor, the resulting composition gives an immediate spontaneous sweet flavor and does not provide any undesired menthol-like aftertaste.

It should be noted, however, that not only is it essential to utilize all four of the components of the composition of the present invention together, namely the dihydrochalcone, the sugar, the cream of tartar and the vanilla flavor, but it is also essential that these components be utilized in the proportions indicated. Lesser or greater amounts of the components has the effect of either bringing back the menthol-like aftertaste or causing delayed sweetness, or both.

DESCRIPTION OF PREFERRED EMBODIMENTS

The following examples are given to further illustrate the present invention. The scope of the invention is not, however, meant to be limited to the specific details of the examples.

EXAMPLE 1

99 lbs. of sucrose, 0.25 lbs. of neohesperidine dihydrochalcone, 0.25 lbs. of vanillin and 0.5 lbs of cream of tartar are thoroughly mixed to provide a uniform mixture.

The resulting mixture is approximately ten times as sweet as sugar and can be used in the place of sugar to give the sweetening effect of sugar, however, with much lower caloric intake. The composition can be used to sweeten beverages or in cooking, in all quantities, even to highly sweeten beverages, without causing any undesired aftertaste and without adversely affecting the taste of the food or beverage to which it is applied.

EXAMPLE 2

A sweetening composition is prepared as in Example 1, however using dextrose in the place of the sucrose. The composition may be used in the same manner as that of Example 1.

EXAMPLE 3

A sweetening composition is prepared as in Example 1, however using lactose in place of the sucrose and using the calcium salt of neohesperidine dihydrochalcone in the place of neohesperidine dihydrochalcone. The composition has substantially the same qualities as the composition of Example 1.

EXAMPLE 4

89 lbs. of sucrose, 4 lbs. of naringin dihydrochalcone, 3 lbs. of vanilla flavor and 4 lbs. of cream of tartar are thoroughly mixed to provide a uniform mixture.

The resulting mixture is approximately ten times as sweet as sugar and may be used in the same manner as the composition of Example 1.

EXAMPLE 5

A composition is prepared as in Example 4, however utilizing fructose in the place of the sucrose and utilizing the sodium salt of naringin dihydrochalcone in the place of the naringin dihydrochalcone.

EXAMPLE 6

94 lbs. of sucrose, 3 lbs. of cream of tartar, 1.5 of vanillin and 1 lb. of neohesperidine dihydrochalcone are thoroughly mixed to provide a uniform mixture having substantially the same properties as the composition of Example 1.

EXAMPLE 7

Example 6 is repeated, however substituting lactose for sucrose. This composition may be used in the same manner as the composition of Example 6.

While the invention has been described in particular with respect to specific compositions, it is understood that variations and modifications can be made. It is further to be understood that all of the salts which are used according to the present invention are edible salts.

What is claimed is:

1. A sweetening composition consisting essentially of (a) a dihydrochalcone derivative selected from the group consisting of neohesperidine dihydrochalcone, naringin dihydrochalone and salts thereof in an amount of about 0.25-4% by weight, (b) a vanilla flavor in an amount of about 0.25-3% by weight (c) cream of tartar in an amount of about 0.5-4% by weight, and (d) a sugar in an amount of about 89-99% by weight.

2. Composition according to claim 1 wherein said sugar is selected from the group consisting of sucrose, dextrose, lactose, and fructose.

3. Composition according to claim 1 wherein said dihydrochalcone derivative is a mixture of neohesperidine dihydrochalcone and naringin dihydrochalcone.

4. Composition according to claim 1 wherein said dihydrochalcone is an edible salt of neohesperidine dihydrochalcone.

5. Composition according to claim 1 wherein said dihydrochalcone derivative is an edible salt of naringin dihydrochalcone.

* * * * *